US008261095B1

(12) United States Patent
Erlingsson

(10) Patent No.: US 8,261,095 B1
(45) Date of Patent: *Sep. 4, 2012

(54) METHODS AND SYSTEMS FOR USING DERIVED USER ACCOUNTS

(75) Inventor: Úlfar Erlingsson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 2231 days.

This patent is subject to a terminal disclaimer.

(21) Appl. No.: 10/144,048

(22) Filed: May 10, 2002

Related U.S. Application Data

(60) Provisional application No. 60/335,894, filed on Nov. 1, 2001.

(51) Int. Cl.
*G06F 11/30* (2006.01)
(52) U.S. Cl. ...................................................... 713/193
(58) Field of Classification Search .................. 717/166; 713/193
See application file for complete search history.

(56) References Cited

U.S. PATENT DOCUMENTS

| | | | |
|---|---|---|---|
| 5,263,147 A | 11/1993 | Francisco et al. | 711/164 |
| 5,265,206 A * | 11/1993 | Shackelford et al. | 726/1 |
| 5,537,548 A | 7/1996 | Fin et al. | |
| 5,604,490 A * | 2/1997 | Blakley et al. | 726/5 |
| 5,619,639 A | 4/1997 | Mast | |
| 5,634,102 A | 5/1997 | Capps | |
| 5,740,370 A * | 4/1998 | Battersby et al. | 709/219 |
| 5,754,938 A * | 5/1998 | Herz et al. | 725/116 |
| 5,760,769 A | 6/1998 | Petrie | 345/334 |
| 5,761,477 A | 6/1998 | Wahbe et al. | 718/1 |
| 5,764,985 A | 6/1998 | Smale | |
| 5,768,519 A | 6/1998 | Swift et al. | |
| 5,787,428 A | 7/1998 | Hart | |
| 5,797,128 A * | 8/1998 | Birnbaum | 707/5 |
| 5,828,893 A | 10/1998 | Wied et al. | 709/229 |
| 5,832,263 A | 11/1998 | Hansen et al. | |
| 5,845,129 A | 12/1998 | Wendorf et al. | 710/200 |
| 5,913,024 A | 6/1999 | Green et al. | 726/3 |
| 5,915,085 A | 6/1999 | Koved | 726/1 |
| 5,918,018 A | 6/1999 | Gooderum et al. | 709/225 |
| 5,956,507 A | 9/1999 | Shearer, Jr. et al. | |
| 5,974,470 A | 10/1999 | Hammond | 709/305 |
| 5,991,877 A * | 11/1999 | Luckenbaugh | 726/1 |
| 6,023,721 A | 2/2000 | Cummings | 709/201 |
| 6,092,192 A | 7/2000 | Kanevsky et al. | |
| 6,141,754 A * | 10/2000 | Choy | 726/1 |
| 6,154,844 A | 11/2000 | Touboul et al. | |
| 6,167,520 A | 12/2000 | Touboul | 726/23 |
| 6,289,458 B1 * | 9/2001 | Garg et al. | 726/21 |
| 6,385,724 B1 * | 5/2002 | Beckman et al. | 713/167 |
| 6,453,418 B1 | 9/2002 | Ooki | |
| 6,505,300 B2 | 1/2003 | Chan et al. | 713/164 |
| 6,513,111 B2 | 1/2003 | Klimczak et al. | |
| 6,529,985 B1 | 3/2003 | Deianov et al. | 710/260 |
| 6,587,888 B1 | 7/2003 | Chieu et al. | 709/313 |
| 6,772,350 B1 * | 8/2004 | Belani et al. | 726/2 |
| 2002/0019941 A1 | 2/2002 | Chan et al. | |
| 2002/0099952 A1 | 7/2002 | Lambert et al. | 726/26 |

FOREIGN PATENT DOCUMENTS

WO     WO 98/21683 A    5/1998

OTHER PUBLICATIONS

Anurag Acharya, et al., "MAPbox: Using Parameterized Behavior Classes to Confine Untrusted Applications", Proceedings of the 9th USENIX Security Symposium, Aug. 14-17, 2000, 17 pages.
Barry Boehm, "Managing Software Productivity and Reuse," University of Southern California, Sep. 1999, pp. 111-113.
P. Deutsch, et al., "A Flexible Measurement Tool for Software Systems," Information Processing (Proceedings of the IFIP Congress), 1972, pp. 320-326.
Guy Edjlali, et al., "History-based Access Control for Mobile Code," 5th Conference on Computer & Communications Security, 1998, pp. 38-48.
Úlfar Erlingsson, et al., "IRM Enforcement of Java Stack Inspection," IEEE, 2000, 10 pages.
Úlfar Erlingsson, et al., "SASI Enforcement of Security Policies: A Retrospective," Department of Computer Science, Cornell University, pp. 87-95.
David Evans, et al., "Flexible Policy-Directed Code Safety," MIT Laboratory for Computer Science, IEEE, 1999, 14 pages.
Timothy Fraser, et al., "Hardening COTS Software with Generic Software Wrappers," TIS Labs at Network Associates, Inc., IEEE, 1999, 15 pages.
Ian Goldberg, et al., "A Secure Environment for Untrusted Helper Applications (Confining the Wily Hacker)," Proceedings of the Sixth USENIX UNIX Security Symposium, Jul. 1996, 14 pages.
Robert P. Goldberg, "Survey of Virtual Machine Research," IEEE Computer, Jun. 1974, vol. 7, No. 6, pp. 34-45.
Manoj Lal, et al., "A Scheduling Scheme for Controlling Allocation of CPU Resources for Mobile Programs," University of California, Davis, Aug. 31, 1999, pp. 1-33.
Jerome H. Salzter, et al., "The Protection of Information in Computer Systems", Proceedings of the IEEE 63, Sep. 1975, 30 pages. Robert Wahbe, et al., "Efficient Software-Based Fault Isolation," Computer Science Division , University of California, SIGOPS, 1993, pp. 203-216.
Islam, N. et al., "A Flexible Security System for Using Internet Content," IEEE, Sep./Oct. 1997, pp. 52-59.

* cited by examiner

*Primary Examiner* — Jacob Lipman
(74) *Attorney, Agent, or Firm* — Sterne, Kessler, Goldstein & Fox P.L.L.C.

(57) ABSTRACT

Methods, systems and articles of manufacture consistent with features of the present invention allow the generation and use of derived user accounts, or DUA, in a computer system comprising user accounts. In particular, derivation rules define how a DUA is linked to or created based on an existing original user account, or OUA. Derivation transformations may also update the state of a DUA based on its corresponding OUA or give feedback from the state of a DUA to the state of its corresponding OUA.

4 Claims, 6 Drawing Sheets

METHODS AND SYSTEMS FOR USING DERIVED USER ACCOUNTS

RELATED APPLICATIONS

This application claims the benefit of priority of provisional application 60/335,894, filed Nov. 1, 2001, which is expressly incorporated herein by reference.

TECHNICAL FIELD

This invention relates generally to user accounts in computer systems and, more particularly, to methods and systems for generating and using derived user accounts.

BACKGROUND

The high cost of equipment in the early days of computing led to the development of time-shared computing systems that allowed multiple concurrent users to simultaneously access the computer systems. User accounts encapsulate the information particular to each individual user, such as the user's name, password, area of transient and persistent storage, configuration information, resource-usage quotas and other properties to be enforced on the user's behavior. By using user accounts, time sharing could be implemented without compromising the systems usability. Whereas previous computer system operations always directly affected the global state of the machine, operations on a user's behalf in systems implementing user accounts typically affect only the information in the user's account. In this manner, each user's actions became isolated from other users since, for the most part, they only affected the individual user's account information.

FIG. 1 illustrates the components in a conventional computer system implementing user accounts. Each operation that involves accessing the state of the system is discriminated to determine if the state being accessed is local to an individual user account or global to the entire system (and therefore shared between all user accounts). If access is to a user-local state, the discrimination procedure determines the context of the access operation, that is, which user's account information to access. In conventional systems, context may be determined by, for example, using a low-level indirection (for memory accesses), the current virtual memory page tables, or a user account reference in each process or thread control block (for system calls).

Since their invention, user accounts have proven very useful. They enhance usability when multiple individuals simultaneously use a computing system and allow for segregation of system activity based on intent. For example, conventional systems may use a supervisor user account, called "root," to run background services. Also, web-server activities may operate as "nobody," that is, a user account with very limited privileges. Additionally, user accounts are integral to maintaining the security of a multiple user computer system since they may be used to control which data a user may access or actions a user may perform.

One key concern of IT professionals today is how to maintain the security of computer systems and data and prevent such systems and data from unauthorized access, modification, or corruption. Security breaches may occur when unauthorized activity results in access to or use of information stored in the computer. Another form of security breach occurs when unauthorized activity changes data or prevents an authorized user from accessing data by modifying permissions, causing a system "crash," or otherwise disrupting the operation of the computer system. Computer systems may also be corrupted unintentionally by, for example, installing or deleting new applications that have the effect of altering system files or configurations that other programs rely on.

One way to cause the system corruption and security breaches mentioned above is to surreptitiously or unintentionally modify the information accessible to a user account. Methods and systems for preventing unauthorized or unintentional modification of user account information will help increase computer system security and stability.

SUMMARY

Consistent with the invention, methods and systems comprising an operating system receive a request to access a resource, initialize at least one derived user account based on at least one original user account and a set of rules; and access the resource based on the at least one derived user account. In some embodiments the at least one user account is initialized by generating the at least one derived user account using user account creation mechanisms of the operating system and populating the at least one derived user account based on the original user account and the set of rules. In other embodiments, the at least one user account is initialized by generating a token representing the at least one derived user account, wherein the token is based at least in part on the original user account. In still other embodiments, the at least one user account is initialized by annotating at least some of the activity of the original user account as belonging to the derived user account. In still further embodiments, the original user account is selectively modified selectively based on the set of rules and the at least one derived user account.

DESCRIPTION OF THE DRAWINGS

The accompanying drawings, which are incorporated in, and constitute a part of the specification, illustrate implementations of the invention and, together with the detailed description, serve to explain the principles of the invention. In the drawings.

DETAILED DESCRIPTION

Figure 1:
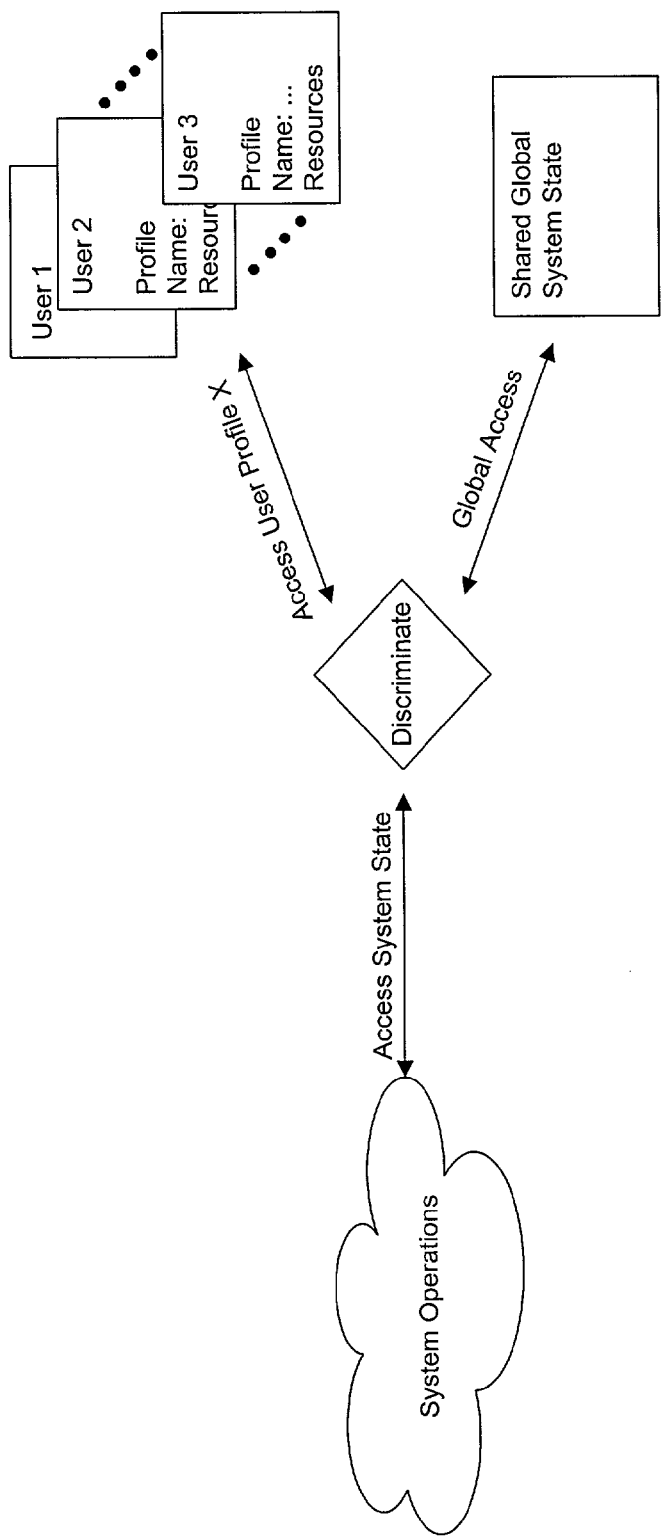
FIG. 1 is block diagram of a conventional system architecture 100 for performing operations accessing state in a multi-user system.

Methods, systems, and articles of manufacture consistent with features of the present invention allow the generation and use of derived user accounts ("DUA") in a computer system comprising an operating system. In particular, certain aspects consistent with the present invention provide derivation rules that define, among other things, how a DUA is linked to an existing original user account "OUA". Still further aspects consistent with the present invention provide derivation transformations which are computable functions for updating the state of a DUA based on its corresponding OUA or giving feedback from the state of a DUA to the state of its corresponding OUA.

Reference will now be made in detail to implementations of the invention, examples of which are illustrated in the accompanying drawings. Wherever possible, the same reference numbers will be used throughout the drawings to refer to the same or like parts.

As is well-known by those skilled in the computer software arts, a conventional general purpose computer has an operating system that performs basic tasks, such as controlling peripheral devices, managing data storage, and policing the execution of software programs that operate on the computer. For example, operating systems enforce process priorities and prevent one program from interfering with another program. Operating systems also provide a means for communication between software programs. Operating systems allocate hardware to various programs running within the computer and act on exceptional conditions that occur during execution of a program. Computer programs access various libraries, file editors, compilers, and assemblers during execution under the direction of the operating system. The operating system also handles security issues, such as protection and access control. Exemplary operating systems include Microsoft's Windows®, UNIX®, Linux, Macintosh OS X, Palm OS®, Pocket PC, and the EPOC platform by Symbian. Windows is a registered trademark of Microsoft Corporation. UNIX is a registered trademark of The Open Group. Palm OS is a registered trademark of Palm, Inc.

In conventional computer systems, operating systems perform the functions mentioned above and others with the help of user accounts. A user account defines the actions a user can perform in the operating system and how the actions are performed. User accounts also establish the privileges, permissions, and rights granted to each user in a network. For example, user accounts control such actions as logging on to a computer, creating or accessing files, running programs, and saving changes to files. User accounts may be limited to a specific user, or specific limited group of users, or be granted to a system administrator. System administrator user accounts are generally reserved for people who have permission to make system-wide changes to the computer, install programs, and access all (or most) files on the computer or network. Persons with a system administrator account with broad permissions may, for example, create and delete user accounts, change most computer settings such as, for example, account passwords and access permissions of limited user accounts, and delete important files.

During operation of a computer, an operating system controls access to files, devices, memory, peripherals, and other system resources based on the user account information. For example, Windows 2000 uses login session tokens to identify the user account and security context of a process, thread, or other activity. During logon, Windows 2000 creates an initial token based on access permissions specified in the user account and attaches the token to the user's logon process. All programs, threads, or other activity instigated by the user, or those impersonating the user, inherit a propagated pointer to the initial token.

When a computer application requests access to a resource, the operating system requires that the application specify up front what type of access it is requesting (such as read, write, delete, create or others). The operating system can also determine which user controls the application and what type of access the application should be granted based on the corresponding user account. In other words, access to resources is, in many cases, specific to individual users. Therefore, when the application performs operations involving the object, the operations are only carried out if the user has permission to access the object in the requested way.

Method

Methods consistent with the present invention allow the use of derived user accounts (DUAs) for certain system operations. DUAs may have all of the properties of traditional user accounts including, but not limited to, its own state, distinct privilege and access control rules, its own unique identifier (such as a security token), and ownership of any system resources (such as files, applications, processes, handles, etc.) In addition, DUAs are linked to at least one particular existing user account (the Original User Account, or OUA). Through use of a DUA, its OUA may be selectively isolated from system operations taking place in the DUA's context. Since the DUA is a legitimate user account, legacy processes will function correctly in a DUA context while modifications to the OUA can be limited through choice of derivation transformations ("DTs") specified by a set of derivation rules ("DRs").

Figure 2:
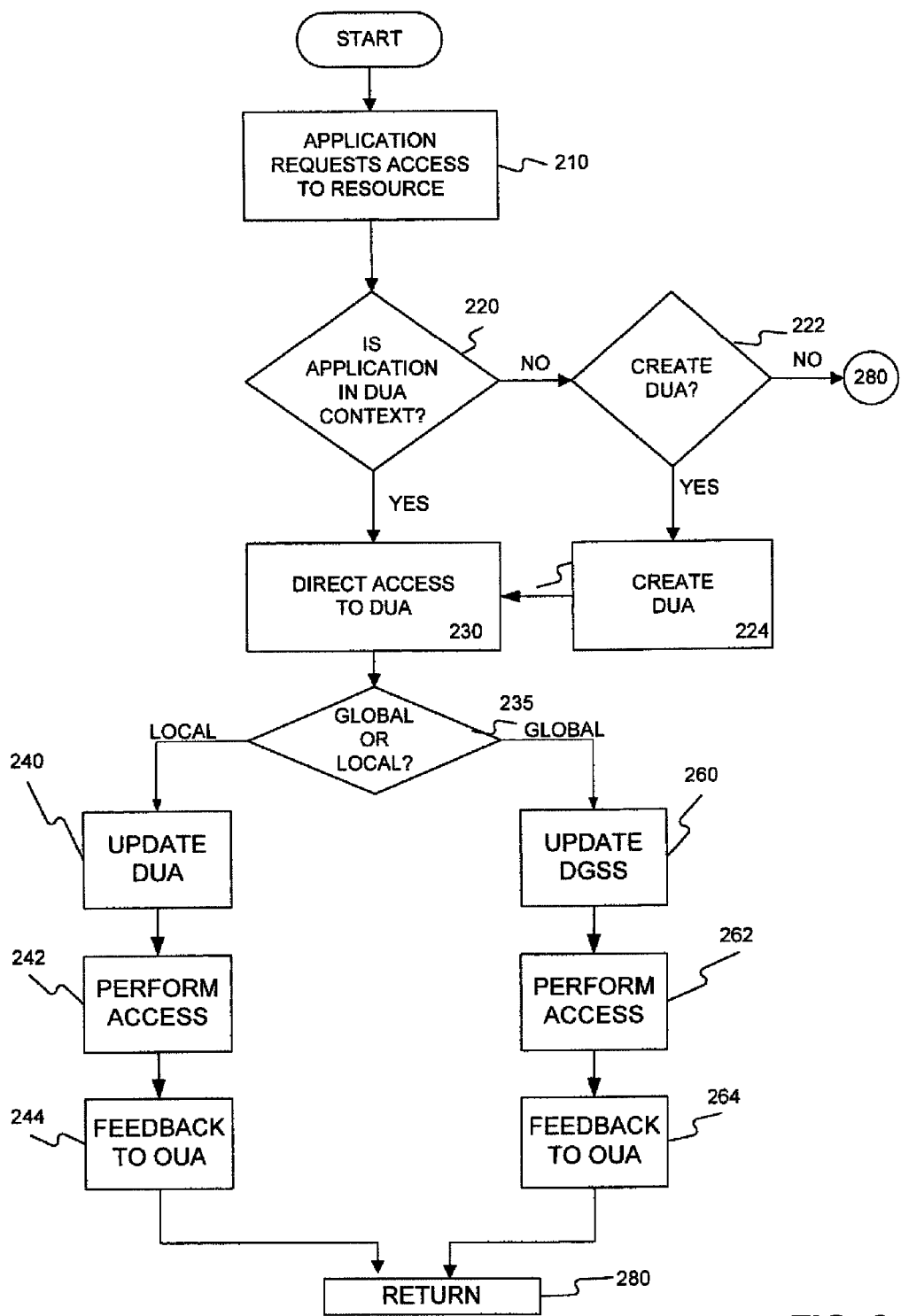
FIG. 2 is a flow diagram of a method for performing access operations using a derived user account consistent with the present invention.

FIG. 2 illustrates the steps of a method for accessing a resource using a derived user account consistent with the present invention. In one embodiment, a software application, P, requests access to a resource, X (step 210). A "resource" in this application may be state information, such as data that lies in memory, file systems, registry configurations, processes, network ports, window handles in graphical user interface ("GUI") systems, or other named abstractions, such as soundcards. The system determines if the software application is already running in the context of a derived user account ("DUA") (step 220). Methods for determining the context of an object, thread, or other activity are well known to those skilled in the computer software arts. For example, in Microsoft Windows 2000, determining whether a thread is running under a local administrator account may be accomplished by examining the access token that is associated with the thread, the thread's identifier, the thread's creation time, or any other identifier that may be mapped to a specific user account.

If the software application is not running in the context of the DUA, the application determines if a DUA should be "created" (step 222). If the application determines that a DUA should not be created, the application continues normally as in step 280.

If it is determined that a DUA should be created (step 224), a DUA may be created according to any of the following exemplary embodiments. In some embodiments consistent with the present invention, a DUA shell may be created by, for example, creating a new user account, "user 2," that may comprise a set different than, or a subset of, the rights and permissions afforded the original user. A DUA shell is the context and the mechanism for propagating the context. DUA shells allow for the automatic propagation of DUA context to all DUA activity, for example, processes or threads, whether they be created as a directly or indirectly as a result of DUA activity. The initial DUA shell may have been established before run-time or established dynamically during operation of the operating system. The creation of the DUA shell may have been invoked randomly or triggered by some event, such as a write access operation.

In this exemplary embodiment, the new user account may comprise rights and permissions that the original user does not have. The new user account, or DUA shell, may be created, for example, by using the existing user account mechanisms in the operating system. Additionally, the ownership of files or objects created or owned by user 2 may need to be modified post-creation to allow the corresponding OUA to have access, if access by OUA is desired. Similarly, user 2 may, by default, access to none or all of the files or objects created or owned by the OUA.

In another exemplary embodiment, a DUA shell may be created by creating a new, possibly restricted, login session or token for the OUA (called OUA', or "OUA prime"). OUA' is distinct and separate from the original OUA session or token, but may have all the same privileges for files and other resources as OUA, such as, for example, ability to use the same display. In some exemplary embodiments, OUA' may have fewer capabilities than OUA (for example, may not be able to shut down the machine or modify the screen resolution). However, by creating a DUA shell in this fashion in, for example, the Microsoft Windows operating system, the activity of OUA' may be discriminated as the associated token that is automatically propagated to any processes, thread, or other activity created directly or indirectly by OUA.

In yet another embodiment, a process group (in Windows 2000, a "job") may implement the DUA shell. As well as being able to implement a DUA shell, a process group or job may also enforce quotas on resource consumption and, in other ways, control access to resources. For example, a process group or job may perform the automatic context propagation needed for discrimination of the DUA activity.

In still another embodiment, a DUA shell may be created by annotating certain OUA activity as actually belonging to the DUA. Annotation occurs when new OUA activity (that actually belongs to the DUA) is initiated such as, for example, on the creation of a thread, process, or other activity, or the impersonation of the OUA. Annotation may take the form of unique bits or an arbitrary sequence of bits associated with the OUA activity. One example is the use of a distinguished entry in handle tables or files descriptor tables. The annotation may be placed on any one or more components of the OUA activity. In addition, the annotation may be placed on any information in the kernel thread control block ("TCB") or kernel process control block ("PCB"), assuming execution in an operating system with a protected mode kernel. One benefit of annotating information in the kernel TCB or PCB is that the annotation can not be compromised by DUA application activity. In certain embodiments, it is preferred that the annotations are not modified in the ordinary course of events.

In some embodiments where DUA shell implementations automatically propagate the context, the annotation may be done automatically. In other embodiments, such as the embodiment immediately above, new threads, processes, or other activity of the DUA, and those impersonating the DUA, may need to be intercepted and annotated as being in DUA, not OUA, context. In still further embodiments, annotation may involve a combination of automatic annotation and non-automatic annotation.

The DUA may be initialized and maintained based on derivation transformations ("DTs") and derivation rules ("DRs"). Derivation rules are a set of rules that link any aspect of a DUA with the corresponding aspect of its OUA. The derivation rules for a resource, X, include derivation transformations, which are computable functions that take an input, modify the input, and return an output. An argument derivation transformation ("ADT") generally receives an argument as input, modifies the input, and returns a second argument as output, although in some embodiments, the ADT does not modify anything. A result derivation transformation ("RDT") takes as input certain values, modifies the values, and returns modified values. An "update DT" or "UDT" may update the state of a DUA based on its corresponding OUA whereas a "feedback DT" of "FDT" may give feedback from the state of a DUA to the state of its corresponding OUA.

The derivation rules and transformations may be authored by a developer or system administrator. In some embodiments, the derivation rules and transformations may be initially authored by a developer or system administrator but are later modified dynamically. Dynamic rules may be modified during run time according run time dependent conditions or other conditions.

In one embodiment, the derivation rules may take the form of script-like directives. For example, an author of rules may use a text editor or similar device to create a human-readable text file containing the rules. In other embodiments, the rules may be authored in semantic formats such as or similar to known scripting languages or high-level computer languages, or in other formats well know to those skilled in the computer software arts. In still other embodiments, the rules are compiled or otherwise processed by a rule generator into a machine-readable form, which is in turn used by the computer system at run time.

Following is one example of derivation rules consistent with the present invention. The first table comprises an exemplary set of rules for DUA events; the second table comprises an exemplary set of rules for OUA events. Each line in the tables represents a derivation rule which describes the actions that will take place for a particular resource access.

| DUA TABLE | | | | | | | |
|---|---|---|---|---|---|---|---|
| orgname | name1 | name2 | open | read | write | list | format |
| /AB | /OUA/A/B | /DUA/A/B | U:X | U:Z F:T | F:Y | U:V | |
| /R/S | /MASQ/RS | /DUA/R/S | U:X' | | | | |
| /DEV3 | /DEV/NUL | /DEV/HD! | | | | | U:K0 A:name1 |

| QUA TABLE | | | | | | | |
|---|---|---|---|---|---|---|---|
| orgname | scrname | destname | open | read | write | list | format |
| /A/B | /DUA/A/B | /OUA/A/B | | F:Y | U:W | | |

As shown in the first line of the DUA table above, if an application operating in DUA context refers to /A/B ("orgname"), and the operation is "read", an update derivation transformation, Z, will be performed using /OUA/A/B as the source ("name1") and /DUA/A/B as the destination ("name2"), after which the actual read operation will be performed on the destination. This in one example of an ADT.

In the example above, the update transformation, Z, may also be followed or preceded by a feedback transformation, T, using /DUA/A/B as the source ("name2") and /OUA/A/B as the destination ("name1").

If an application refers to /R/S/ and the operation is "open", the UDT, V, will be performed taking /MASQ/RS as the input and /DUA/R/S as the output, after which the open operation will actually be performed on /DUA/R/S. /MASQ/RS is data introduced by the DUA mechanism or the rules and, as described below, may be unrelated to the OUA.

In some embodiments, whether or not a DT is specified, the operation is performed on an actual named resource or object, with the rules having as a default one of the names specified in the DUA table above. In this particular example, name2 represents the actual named resource accessed by all operations by default as specified by design. As shown in the third line of the DUA table, in some embodiments, the operation may be performed on name1, as specified, overriding the default case. This last example may be considered one example of an ADT, as the orgname is modified to name2.

Referring now to the OUA table above, if OUA activity refers to /A/B, and the operation is "read," the system will perform a feedback transformation, Y, using /DUA/A/B as input and /OUA/A/B as output before actually performing the read operation on /OUA/A/B.

There are many possible types of derivation transformations, some examples of which are as follows. "Equivalence DTs" may be used to ensure certain parts of the DUA state and the OUA state remain identical. In this case, for example, the state of the DUA may be copied back to the OUA in an feedback DT or the state of the DUA may be refreshed, for example, by an update DT that copies over one or more aspects of the DUA with information from the OUA. Equivalence DTs may be useful in cases where it is desired to have changes in either the DUA or OUA automatically reflected in the other. For example, the system volume control state may need an equivalence DT if volume changes in a DUA are to have the expected effect.

A "copying DT" can ensure that parts of DUA state are copies of the corresponding OUA state, and that any modifications are performed only on the DUA copy. Copying DTs may be used to limit the effects of operations in DUA context upon the information of its OUA. Copying DTs may be useful in situations where a user may wish to example of this would be during installation of new software or during debugging of software. If errors occur while operating with a modified DUA, the original OUA is never actually modified. Thus, operations may revert to the original OUA, and the system may be very quickly and easily returned to the old state. In some embodiments, a user may wish to use a copy DT in non-experimental situations where the system is deliberately operated in the DUA context with no intentions of ever modifying the OUA. This may be useful, for example, for security or integrity reasons. In these embodiments, the DUA may be deliberately discarded after the requested action is performed without update to the OUA.

Yet another example of a derivation transformation is a "masquerading DT." Masquerading DTs can specify properties for certain parts of a DUA state, irrespective of the corresponding state of its OUA. Masquerading DTs can be used to perform operations in a DUA where certain states have values unrelated and (perhaps radically) different from that state's values in the OUA. In fact, a masquerading DT may specify that the data for the DUA may be taken from a source other than the OUA. This type of derivation transformation allows operations to be performed in a modified version of the OUA context. Masquerading DTs may be useful in cases of experimentation because the performance of the system using modified state information may be evaluated without modifying the OUA.

A "partitioning DT" ensures that there is no overlap between certain aspects of the DUA and the OUA state, that is, partitioning their namespace or other sets of values. For example, a partitioning DT may assign a new name, Z, to the DUA and rename the resource, X, to be Y, defined as the concatenation of X with Z. Then, the application is allowed to access the resource Y without accessing the original resource X. Partitioning DTs may be necessary when multiple entities, such as the OUA and DUA, or even multiple DUAs, are concurrently sharing resources and each action must have access to, what appears to be, the full capabilities of that resource. One exemplary operation is the simultaneous access of transient or persistent storage by more than one application. Multiple DUAs can concurrently share state—each believing it has full and exclusive access to that state—as long as a partitioning DT creates a new partition of that namespace for each DUA.

A "liveness DT" changes lifetime properties of certain parts of DUA state from those of its OUA, that is, it may make state that is persistent in the OUA transient in the DUA. The OUA may even be purged at regularly timed intervals. Conversely, any other such state meta-information including, for example, access control attributes, may be set to differ using a liveness DT between the DUA and its OUA.

"Dynamic DTs" may be used to specify an arbitrary relationship between a certain state value found in both the DUA and the OUA. For example, in one embodiment consistent with the present invention, a dynamic DT may remove the ability of a DUA to set volume to its maximum value, while still retaining the DUA's ability to perform operations affecting volume—simply, the dynamic DT can set OUA volume value to 90%, if the DUA volume value is set to 90% or higher, otherwise effecting an equivalence DT. Similarly, a dynamic DT can effect the introduction of a named state to the DUA when that state is not found in the OUA, or the removal of a named state from the DUA when that state is found in the OUA. A dynamic DT may implement this, for example, by modifying the behavior of all state namespace enumeration operations—and with the assistance of a partitioning DT, either account can create or remove such (introduced or removed) state independently.

Derivation transformations may also specify that if an original state value is within a range [A,B] specified by the derivation rule, than the corresponding state value in the DUA is the original state value of the OUA. If not, the state value of the DUA becomes either A or B, whichever is closer to the original state value. This update derivation transformation may be referred to as a "Bounded value" DT. Feedback may also be bounded in a similar manner. In a feedback bounded value DT, for example, if a state value of the DUA is within a range [A,B] specified by the derivation rule, the OUA will get the state value of the DUA. Otherwise, the OUA will receive whichever of A or B is closer to the state value of the DUA.

Still other examples of derivation transformations consistent with the present invention operate on metadata. For example, it may be desired to initially provide access to all information in a data or file, but when copying is performed, it is desired to limit copying to the contents and not copy the metadata, such as access control permissions, time stamps, and name of the file. The derivation rule may block the copying of the metadata but may provide different information in its place, that is, some or all of the metadata may be masked.

An "enumeration" transformation excludes or adds information to a list. An "enumeration" transformation is a variety of a masquerading transformation in the sense that it masks the real information by adding members to the real list or deleting actual members from the real list before allowing access to the list.

One skilled in the art will recognize that there exist many possible derivation transformations and derivation rules. The list above is only exemplary and not meant to comprise the universe of allowable derivation transformations and rules.

Referring back to FIG. 2, once a DUA is created, the application is executed using the DUA, not the original user account. If, for example, the DUA is a new user account, as described above, the application may be redirected to the DUA. If, in another example, the DUA is a token, as is also described above, the application may execute based on permissions in the DUA token. In still another example, the arguments of the application may be modified in accordance with the DUA so that the original application may execute on the modified arguments. The method continues from step 230.

If the application is already operating in DUA context (step 220), the application is executed using the DUA (step 230). The system determines whether the resource sought by the application relates only to a specific user account (that is, a "local" resource) or is information that is shared between multiple user accounts (step 235). If the resource is shared, or "global," the DUA contains derived global system state ("DGSS") information and derivation transformation rules that update or feedback to more than one user account.

In either case, the system determines the type of access requested (steps 240 and 260). Additionally, the DUA or DGSS may optionally be updated by information from the OUA based on the applicable derivation rule before the requested activity is performed (steps 242 and 262). These actions help ensure that the system will have access to the most current information in the QUA. After the DUA or DGSS are updated (steps 240 and 260), the requested activity is performed by reading the DUA or DGSS (steps 242 and 262). Depending on the type of access requested and the derivation transformation rules, the system may optionally communicate changes to the DUA or DGSS back to the OUA in a feedback transformation, if such feedback is indicated (steps 244 and 264).

In each case, after the application performs the requested activity, the system is returned to normal operations (step 280).

Figure 3:
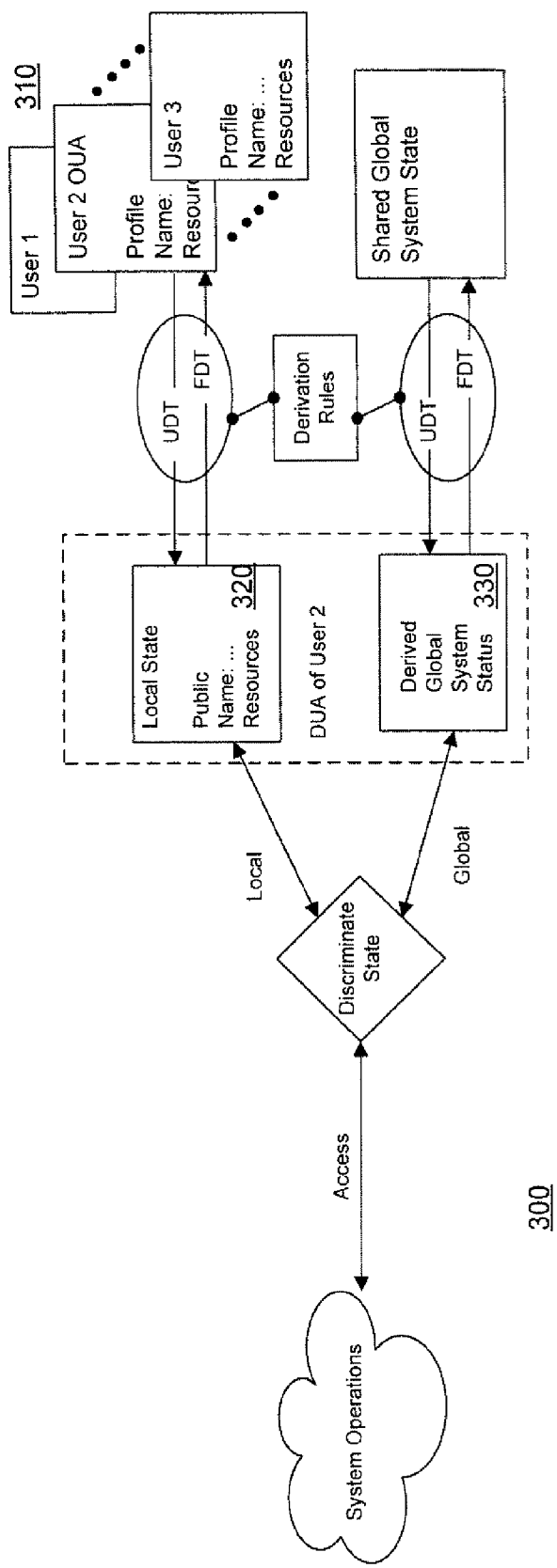
FIG. 3 is block diagram of a system 300 for performing operations accessing state of a derived user account in a multi-user system consistent with the present invention.

FIG. 3 is block diagram of a system 300 for performing operations accessing state of a derived user account in a multi-user system consistent with the present invention. FIG. 3 illustrates the components in a DUA-enabled system consistent with the present invention. As shown in FIG. 3, during operation of an operating system, application 310 requests access to a system state. Consistent with the principles of the present invention, the system discriminates whether the system is requesting access to local state information 320 of a user account or derived global system state information 330 and directs the requesting application to the appropriate state information of the DUA. As shown in FIG. 3, the DUA state information may be updated based on the corresponding state information of the corresponding OUA and update derivation transformations (UDTs) based on the derivation rules. The DUA may feedback state information to the corresponding OUA based on a feedback transformation (FDT) and the derivation rules. The derived global system state information 330 may be similarly updated based on UDTs and may feed back information to the original shared global system state based on FDTs.

The above represents one exemplary embodiment of the present invention. In some embodiments, DUA events can also occur even though no access is being made to the DUA or OUA resources. In particular, DUA events may occur on a resource X at a specific time, or at specific timed intervals, or given the satisfaction of an arbitrary predicate on the system state or the system environment.

Exemplary System Architecture

Figure 4:
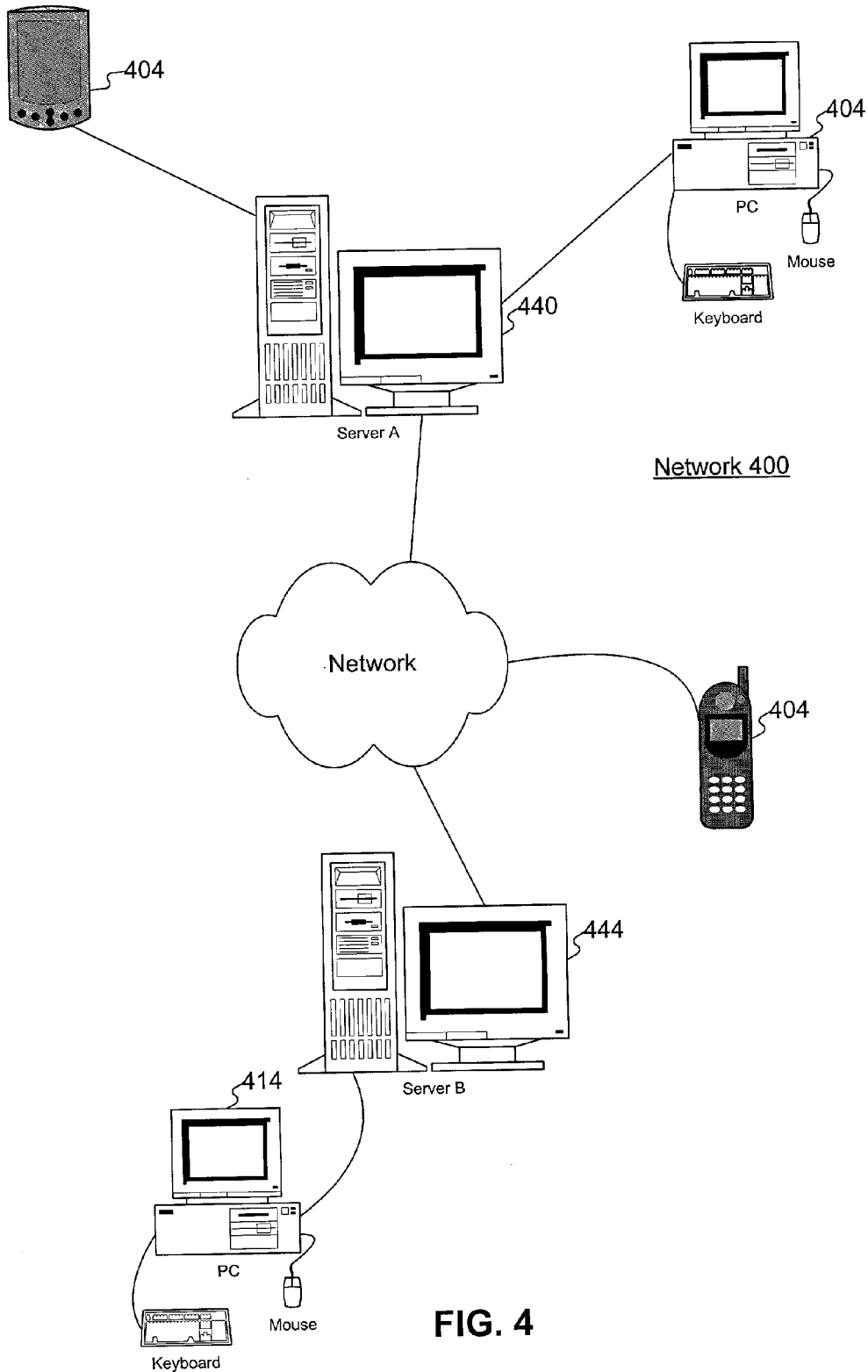
FIG. 4 illustrates one embodiment of a system consistent with the present invention.

FIG. 4 illustrates one embodiment of a system consistent with the present invention. In fact, any conventional computer system supporting the abstraction of user accounts may be programmed to support the principles of the present invention. The system in FIG. 4 represents a computer network 400 that comprises one or more client computers 404 and 414 and one or more servers 440 and 444. In this specification, the terms "client" and "server" are used to refer to a computer's general role as a requester of data (client) or provider of data (server), however each computer may request data in one transaction and provide data in another transaction, thus changing the computer's role from client to server. Client 404 may also be a thin client, which is generally understood to be a network computer without a hard disk drive. Client 404 may also be a personal digital assistant ("PDA"), such as a PalmPilot, a cellular phone, or other computerized device. As shown in FIG. 4, client 404 may be connected to one or more servers by a suitable bus or wireless connection.

In some embodiments, a software application operating on client 404 may place a request that involves data stored on or instructions that are executed on Server A 440. Since client 404 is directly connected to Server A 440, for example, through a local area network, this request would not normally result in a transfer of data or instructions over what is shown as "network" of FIG. 4. The "network" of FIG. 4 represents, for example, the Internet, which is an interconnection of networks. A different request may involve data or instructions stored on Server B 444. In this case, the data may be transferred from Server B 444 through the network to Server A 440 and, finally, to computer 402. The distance between Server A 440 and Server B 444 may be very long, e.g. across states, or very short, e.g., a few inches. Further, in traversing the network the data may be transferred through several intermediate servers and many routing devices, such as bridges and routers.

Figure 5:
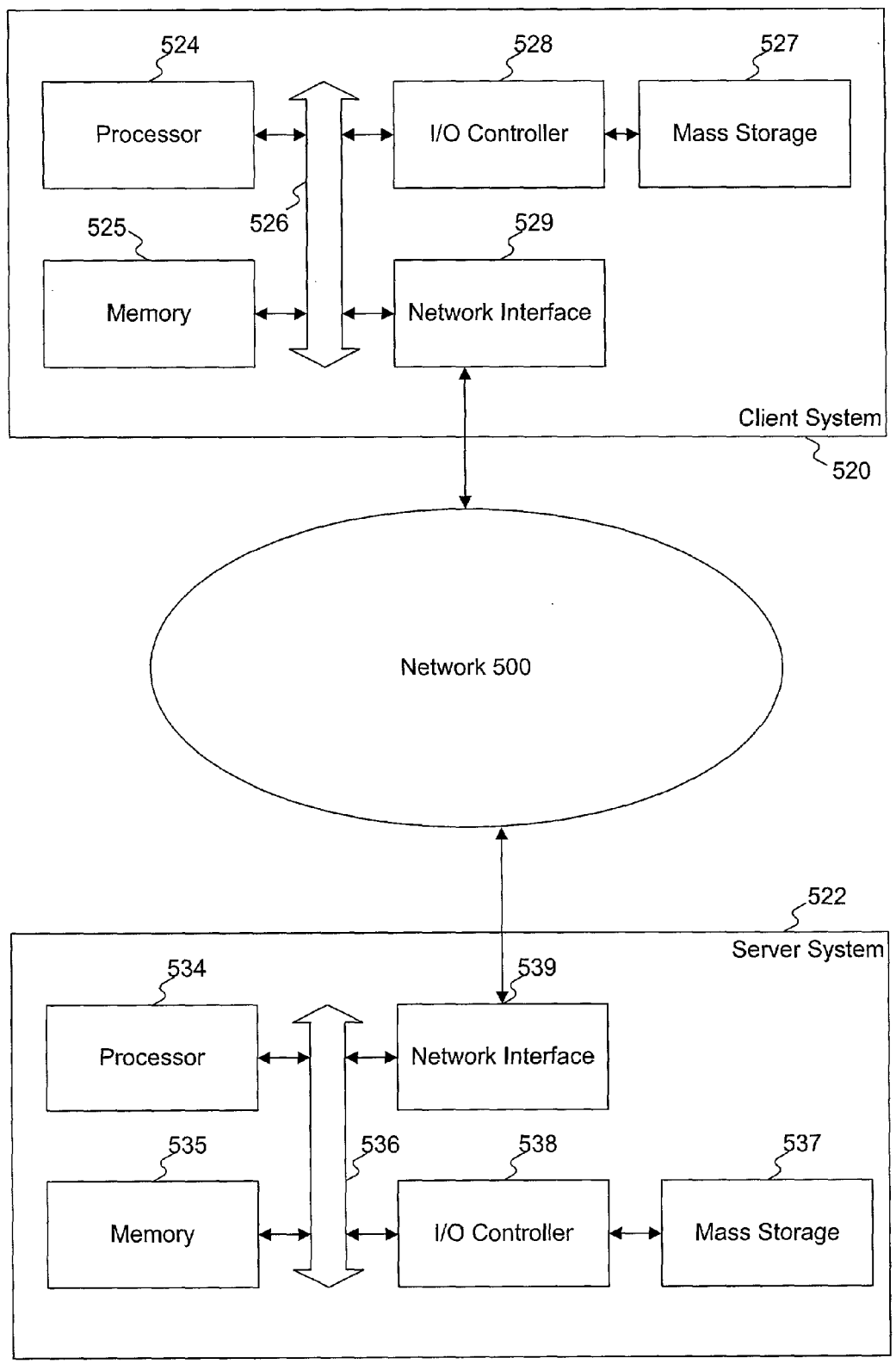
FIG. 5 shows, in more detail, an example of a client-server system interconnected through network 100.

FIG. 5 shows, in more detail, an example of a client-server system interconnected through network 500. In this example, a server system 522 is interconnected through network 500 to client system 520. Client system 520 includes conventional components such as a processor 524, memory 525 (e.g. RAM), a bus 526 which couples processor 524 and memory 525, a mass storage device 527 (e.g. a magnetic hard disk or an optical storage disk) coupled to processor 524 and memory 525 through an I/O controller 528 and a network interface 529, such as a conventional modem.

Server system 522 also includes conventional components such as a processor 534, memory 535 (e.g. RAM), a bus 536 which couples processor 534 and memory 535, a mass storage device 537 (e.g. a magnetic or optical disk) coupled to processor 534 and memory 535 through an I/O controller 538 and a network interface 539, such as a conventional modem. It will be appreciated from the description below that the present invention may be implemented in software which is stored as executable instructions on a computer readable medium on the client and server systems, such as mass storage devices 527 and 537 respectively, or in memories 525 and 535 respectively. Rules or derivation transformations may be stored in, for example, memory 525 or mass storage 527 on client system 520 or memory 535 or mass storage 537 on server system 522.

Processors 524 and 534 may be microprocessors such as the Pentium® family microprocessors manufactured by Intel Corporation. However, any other suitable microprocessor, micro-, mini-, or mainframe computer, may be used. Memories 525 and 535 may include a random access memory (RAM), a read-only memory (ROM), a video memory, or mass storage. Mass storage 527 and 537 may include both fixed and removable media (e.g., magnetic, optical, or magnetic optical storage systems or other available mass storage technology). Memories 525 and 535 may contain a program, such as an operating system, an application programming interface (API), and other instructions for performing the methods consistent with the invention.

Figure 6:
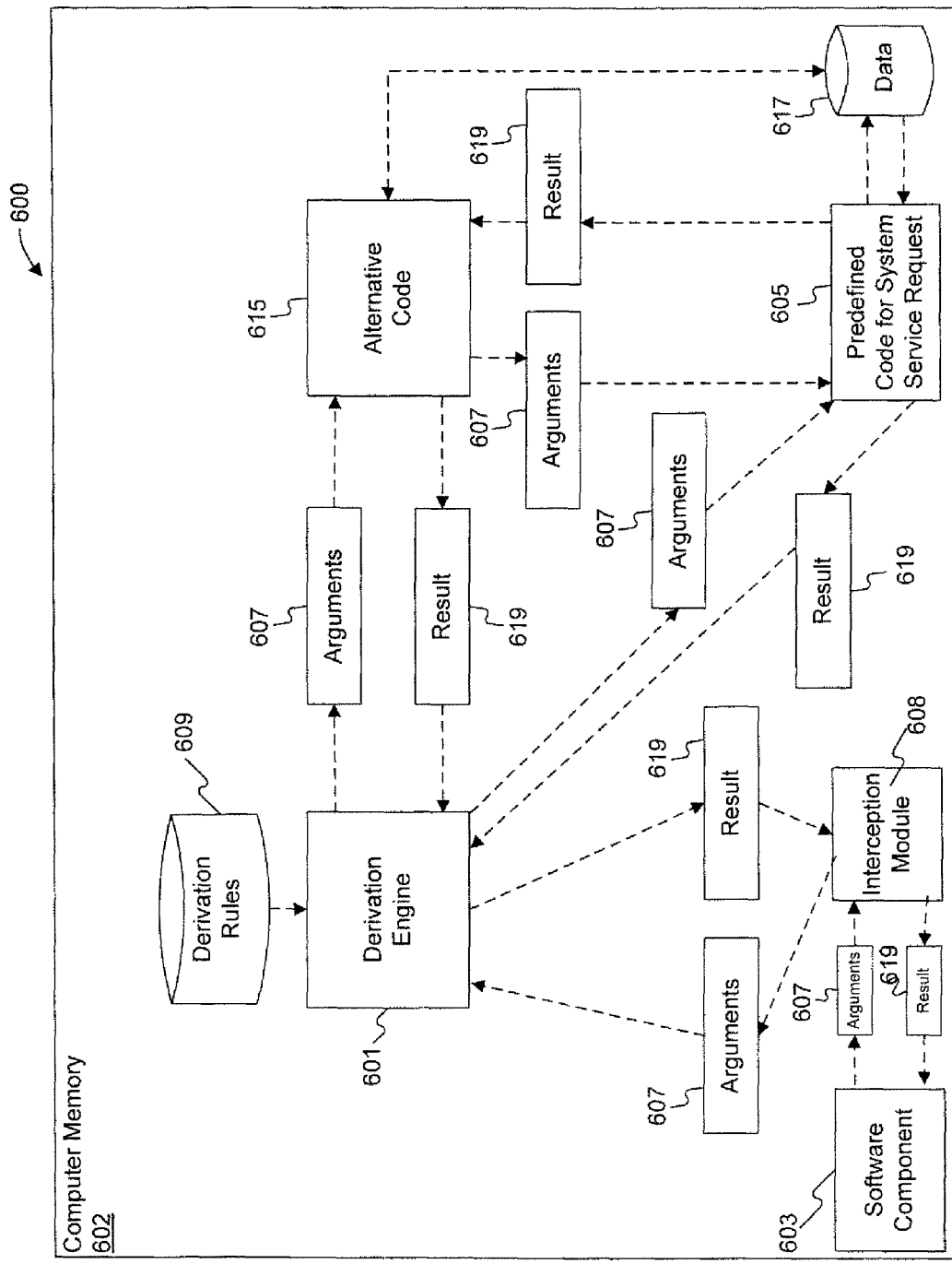
FIG. 6 is a block diagram illustrating one exemplary embodiment of a system using DUAs consistent with the present invention.

Derived user accounts also may be generated and used in a system, such as that described in commonly assigned, co-pending application Ser. No. 10/082,591, filed Feb. 22, 2002, entitled "Altered States of Software Component Behavior," which is expressly incorporated herein by reference in its entirety. FIG. 6 illustrates one such exemplary system 600. As shown in FIG. 6, a software component 603, executing in computer memory 602 may request access to a resource, X. The request may comprise arguments 607, such as a source name or a destination name, and a requested action, such as, for example, open, read, write, list, or format. In one embodiment consistent with the present invention, the request may be intercepted by interception module 608, which may be understood as software code residing between predefined code 605 and the actual software code that is executed in response to the request. Interception module 608 captures the request, including arguments 607, and passes the request and arguments to derivation engine 601 which, as described below, manages the actual calling of code in response to the request.

Techniques for intercepting the request are well known to those of ordinary skill in the software arts. For example, interception of a hardware or software supported system call may comprise redirection of an interrupt service vector to alternative code. For library-based services, interception can take the form of the modification of dynamically-linked libraries (prior to loading or at link time, as desired). For any subroutine or function-based service, redirection of the subroutine call instruction, or machine-code patching of subroutine entry code can be employed. Any service dispatch mechanism based on dynamic name-resolution can be intercepted by a change in the service-lookup namespace.

In other embodiments consistent with the present invention, derivation engine 601 receives a request directly from software component 603. For example, software component 603 may call the derivation engine 601 or derivation engine 601 itself captures software component 603.

Once the request is received by derivation engine 601, either directly or indirectly, derivation engine 601 may consult derivation rules 609, which may be dynamic or static, for assistance in processing the request in accordance with the present invention. Derivation rules 609 comprise derivation transformations, as described above. Based on the derivation rules 609, derivation engine 601 determines how to direct access to a derived user account. For example, if the request specifies to write data to a location A specified by the request, in the DUA context, the arguments 607 of the request may be modified by derivation engine 601 in accordance with derivation rules 609. In one exemplary embodiment, as described with reference to the DUA table shown above, if a request (which in this example is an application) requests that a read operation be performed on original name "/A/B," and the appropriate derivation rule comprises the derivation transformation, Z, which specifies that read operations on /OUA/A/B should instead be performed on /DUA/A/B, the arguments of the request may be modified so that /DUA/A/B is the source of the data for the read operation.

Once derivation engine 601 modifies arguments 607 in accordance with the derivation rules, derivation engine 601 may pass arguments 607 to predefined code 605 or alternative code 615. In addition, alternative code 615 may invoke predefined code 605 at some point during its execution. In some embodiments, alternative code 615 may modify data 617 or dynamic derivation rules 609. A result 619 may be returned from execution of predefined code 605 or alternative code 615 to derivation engine 601. Derivation engine 601, in turn, returns result 619 to software component 603.

The present invention also relates to computer readable media that include program instruction or program code for performing various computer-implemented operations based on the methods of the present invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using, for example, an interpreter or equivalent execution engine to facilitate execution of high level code.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for accessing a resource in a computer system, comprising an operating system, the method comprising:
   receiving a request to access the resource;
   initializing at least one derived user account based on at least one original user account and a set of rules at least in part by:
      generating the at least one derived user account using user account creation mechanisms of the operating system; and
      populating the at least one derived user account based on the original user account and the set of rules at least in part by:
         setting a value for at least one state in the at least one derived user account as the closer of two end values of a range if the value of a corresponding state of the at least one original user account is outside the range; and
         setting the value for the at least one state in the at least one derived user account as the value of the corresponding state of the at least one original user account if the value of the corresponding state of the original user account is within the range; and
   accessing the resource based on the at least one derived user account.

2. A computer-implemented method for accessing a resource in a computer system, the method comprising:
   receiving a request to access the resource on behalf of an activity associated with a user;
   determining if at least one derived user account corresponding to the user activity exists;
   initializing the at least one derived user account based on an original user account and a set of rules, if no derived user account corresponding to the user exists, or updating the at least one derived user account based on the original user account and the set of rules, if at least one derived user account exists, wherein:
      the set of rules specify to initialize or update the at least one derived user account by setting at least one aspect of the derived user account to a first value, if the corresponding aspect of the original user account is below a certain range, or to a second value, if the corresponding aspect of the original user account is above a certain range, or to the same value as the corresponding aspect of the original user account if the corresponding aspect of the original user account is within the range; and accessing the resource based on the at least one derived user account.

3. An apparatus comprising:
at least one memory having program instructions to execute an operating system; and
at least one processor configured to execute the program instructions to perform the operations of:
receiving a request to access a resource;
initializing at least one derived user account based on at least one original user account and a set of rules at least in part by:
    generating the at least one derived user account using user account creation mechanisms of the operating system; and
    populating the at least one derived user account based on the original user account and the set of rules at least in part by:
        setting a value for at least one state in the at least one derived user account as the closer of two end values of a range if the value of a corresponding state of the at least one original user account is outside the range; and
        setting the value for the at least one state in the at least one derived user account as the value of the corresponding state of the at least one original user account if the value of the corresponding state of the original user account is within the range
determining at least one state in the at least one derived user account by copying the corresponding state in the original user account; and
accessing the resource based on the at least one derived user account.

4. An apparatus comprising:
at least one memory having program instructions; and
at least one processor configured to execute the program instructions to perform the operations of:
receiving a request to access a resource on behalf of an activity associated with a user;
determining if at least one derived user account corresponding to the user exists;
initializing the at least one derived user account based on an original user account and a set of rules, if no derived user account corresponding to the user exists, or updating the at least one derived user account based on the original user account and the set of rules, if at least one derived user account exists, wherein the set of rules specify to initialize or update the at least one derived user account by setting at least one aspect of the derived user account to a first value, if the corresponding aspect of the original user account is below a certain range, or to a second value, if the corresponding aspect of the original user account is above a certain range, or to the same value as the corresponding aspect of the original user account if the corresponding aspect of the original user account is within the range;
accessing the resource based on the at least one derived user account; and
selectively modifying the original user account based on the set of rules and the at least one derived user account.

* * * * *

UNITED STATES PATENT AND TRADEMARK OFFICE
CERTIFICATE OF CORRECTION

| | | |
|---|---|---|
| PATENT NO. | : 8,261,095 B1 | Page 1 of 1 |
| APPLICATION NO. | : 10/144048 | |
| DATED | : September 4, 2012 | |
| INVENTOR(S) | : Ulfar Erlingsson | |

It is certified that error appears in the above-identified patent and that said Letters Patent is hereby corrected as shown below:

Column 12
Line 51, Claim 2, please replace "user activity" with --user--.

Signed and Sealed this
Twenty-seventh Day of November, 2012

David J. Kappos
*Director of the United States Patent and Trademark Office*